Patented Aug. 21, 1945

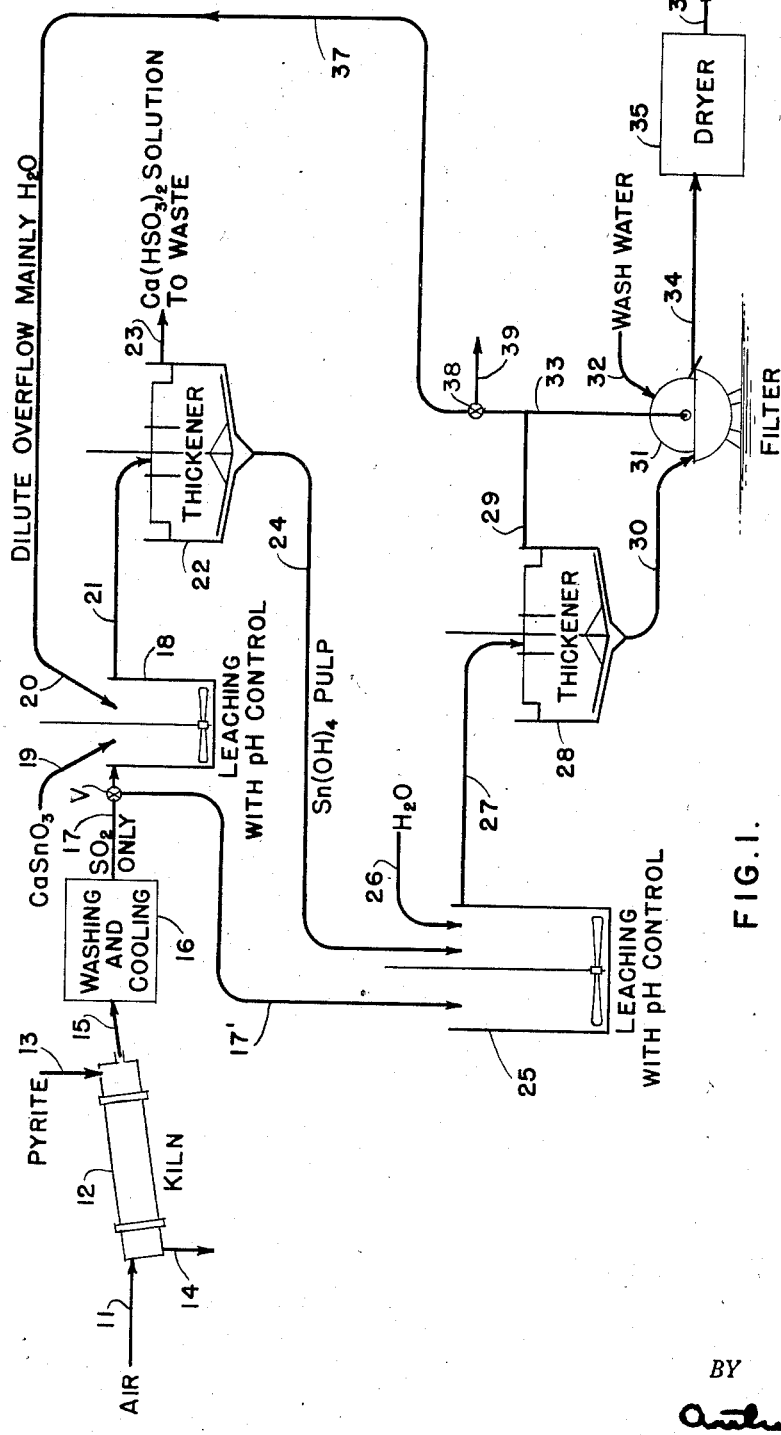
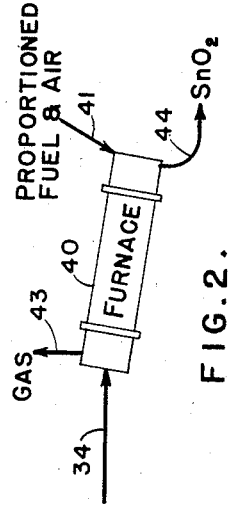

2,383,427

UNITED STATES PATENT OFFICE 2,383,427

CALCIUM STANNATE REFINING

Robert B. Thompson, Wilton, and Elliott J. Roberts, Westport, Conn., assignors to The Dorr Company, New York, N. Y., a corporation of Delaware Application July 28, 1943, Serial No. 496,390

12 Claims. (Cl. 23—144)

This invention relates to a method of refining calcium stannate, usually derived from the treatment of tin ores, concentrates, or tailings, yielded in the process of recovering tin therefrom, and also derived from de-tinning plants.

In several places in the world, there are large quantities of tailings which have accumulated over a period of years, from the treatment of tin ores. Such tailings have a considerable residual tin content which heretofore was not considered serious. However, with the conditions resulting from the war and the loss to the United Nations of important sources of newly mined tin ore, it is now desirable to recover tin from secondary sources such as these tin tailing piles.

The problem of extracting tin from such tin tailings has received the attention of inventors and one proposal for treating such tailings is described in the U. S. A. patent application of Gregoire Gutzeit, Elliott J. Roberts and Robert B. Thompson, Ser. No. 473,406, filed January 23, 1943. That application proposes to treat such tailings or possibly tin ore itself in a reducing-sulphidizing roast and then while reduced, subjecting the roasted material to leaching by sodium hydroxide (NaOH). The resulting solution is reacted with lime, and the resulting precipitate is filtered and calcined to produce calcium stannate ($CaSnO_3$).

An object of this invention is to treat such calcium stannate in such a way as to remove the calcium therefrom so that a product considerably richer in tin is produced. The tin product resulting from this invention is $SnO_2$, which may or may not be contaminated with other impurities. If it should be contaminated, as it usually is, with compounds of antimony and arsenic, then they may be appropriately removed, although another object of this invention is to facilitate the removal of a significant portion of the contaminating antimony in connection with the removal of calcium from the $SnO_2$. A still further object is to facilitate removal of such antimony or antimony-bearing contaminant.

Calcium stannate such as comprises the end product of the Gutzeit et al. U. S. A. patent application Ser. No. 473,406, is the starting point of this invention, which then proposes to treat calcium stannate ($CaSnO_3$) in a water suspension with $SO_2$ gas supplied thereto in quantities sufficient to convert calcium thereof to calcium bisulfite, $Ca(HSO_3)_2$, the chemical reaction comprising $$CaSnO_3 + 3H_2O + 2SO_2 \longrightarrow Ca(HSO_3)_2 + Sn(OH)_4$$

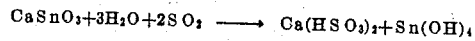

In solution    Insoluble

This chemical reaction, if carried out under the proper conditions of pH and of dilution, will cause substantially all of the calcium of the stannate to be dissolved and converted into calcium bisulfite, while only a minor portion of the tin present is dissolved. Naturally one object is to retain the tin compound insoluble while rendering all of the calcium soluble. So the conditions under which the chemical reaction is induced must be carefully controlled.

The first requirement is that the pH of the reactants of $CaSnO_3$, $H_2O$ and $SO_2$ is low enough to dissolve calcium but not low enough to dissolve tin. Also the dissolution of calcium by the solution involves dilution because sufficient water must be provided to allow calcium to dissolve in the form of $Ca(HSO_3)_2$. In other words, the solubility of $Ca(HSO_3)_2$ at the pH of the solution must not be exceeded and this is accomplished by controlling the proportion of water used. Therefore, the main factors of pH and dilution must be controlled to obtain differential dissolution of calcium and the non-dissolution of tin.

If the pH of the solution is as low as 2.5, it will begin to dissolve tin. The natural tendency might be to raise the pH much above that, but the higher the pH, the more water is needed to increase the dilution of the solution. And as this process is likely to be practiced where water is not readily obtained, it is important to try to find a pH that has a factor of safety above the point of tin dissolution and yet is not high enough to use water excessively. That point is pH 3.5, which means that in the solvent solution used, there is a slight excess of $H_2SO_3$.

The $SO_2$, which is one of the starting materials of the dissolving solution, is preferably produced by burning pyrite in a pyrite burner or kiln for producing the $SO_2$ gas. But the $SO_2$ gas used in making up the solution should be pure with a minimum amount of $SO_3$ or oxygen present. Oxygen is harmful because it oxidizes $SO_2$ to form $H_2SO_4$. The presence of $H_2SO_4$ in the solution results in the formation of $CaSO_4$ which has such a low solubility under conditions used that its presence must be avoided or held to a minimum as determined by the solubility of $CaSO_4$ in the solution used, if the presence of $CaSO_4$ in the final product is to be avoided.

After the reaction has taken place, the pulp is then dewatered to produce a cake of tin oxide with combined water ($Sn(OH)_4$) that is substantially calcium free. This cake may be dried or ignited to remove the combined water so that $SnO_2$ is yielded which is then ready for further refining. Thus, the starting material has had its grade substantially raised. For instance, in the calcium stannate starting material, there is from 50—52% Sn on a calcined basis, whereas after the treatment of this invention, there is about 78% Sn on a calcined basis.

As has been stated, if the filter cake is dried to remove the combined water, an end product $SnO_2$ is yielded which while substantially calcium-free, has certain contaminations of antimony and arsenic. It has been found that a major portion of the antimony contamination can also be removed from the filter-cake if instead of merely drying it to remove the combined water, the filter-cake, after being dried, is subjected to a slightly reducing roast at a temperature lying in a range substantially of 900° C. to 1100° C., the antimony constituent of the cake is reduced and volatilized, whereupon the end product of this process comprises $SnO_2$ that is substantially calcium-free and substantially antimony-free; that is, having a calcium content with as little as 0.3% calcium and an antimony content with as little as 0.01% antimony on the tin. A time factor enters into this antimony removal, since the lower the temperature used, the longer must be the time of the heat treatment. That is, two hours treatment at the higher temperature is better than three hours at the lower temperature. What happens is that the antimony-bearing constituent of the $SnO_2$ seems to be in the form of antimony pentoxide or at least the antimony present seems to be in the pentavalent form. When the mass is heated to from 900° C. to 1100° C. in the slightly reducing roast, the antimony-bearing constituent is reduced to antimony trioxide which is volatile at those temperatures and goes off as a gas. At other temperatures the antimony-bearing constituent does not seem to be volatile. However, the "slightly reducing" roast must be defined because it seems to be as critical as the temperatures. The atmosphere of the roasting kiln or furnace must contain a reducing gas that is equal to a mixture of carbon monoxide (CO) and carbon dioxide ($CO_2$) in a proportion as 1 to 10. A mixture of those gases in the proportion of 1 to 5 will not produce the desired result. Therefore, it seems deducible that in a strongly reducing roast, metallic antimony is yielded which will not volatilize at the temperatures used, and in a neutral roast, the antimony pentoxide remains unchanged, which also will not volatilize at the temperatures used, so the satisfactory result seems to depend upon the combination of specific proportion of reducing roast, the volatilization temperature, and the duration thereof.

The accompanying drawing illustrates in Figure 1 the flowsheet or flow chart of an assembly or system in which this invention may be practiced, but as the drawing is entirely diagrammatic, no effort has been made to show relative sizes of the respective stations thereof. Figure 2 shows a substitute arrangement for the dryer 35. In the drawing, air 11 is fed to kiln 12 designed to treat pyrite 13 for the production of sulfur dioxide gas. The calcined residue passes from the kiln at 14 and the evolved gas passes by pathway 15 to a washing and cooling station 16 so that sulfur dioxide ($SO_2$) only is passed through pathway 17 to leaching station 18, and through pathway 17 to leaching station 25, which stations comprise usually one or more agitators of some sort.

Calcium stannate ($CaSnO_3$), 19, which normally contains some contaminants and particularly antimony or some compound thereof, is supplied to the leaching station 18 and so is water ($H_2O$) 20 (or the equivalent thereof described later) under conditions whereby there is a careful control of the pH and the dilution in the leaching station. The sulfur dioxide goes into solution in the water to produce sulfurous acid ($H_2SO_3$). The leached material is passed along flow-path 21 to a dewatering or thickening station 22 from which effluent is released along pathway 23 which comprises a calcium bisulfite $$Ca(HSO_3)_2$$

solution which goes to waste.

Underflow from the thickener 22 which comprises $Sn(OH)_4$ pulp passes through flowpath 24 to a second leaching station (agitator 25) to which water 26 is supplied under conditions whereby there is a careful control of the pH and the dilution in this leaching station. Sulfur dioxide is added through pathway 17 and goes into the solution in the water to produce sulfurous acid ($H_2SO_3$). The leached material is then passed along flowpath 27 to a second thickener station 28 from which effluent is released through a conduit 29 which comprises highly dilute calcium bisulfite. This effluent solution is so dilute as to comprise mainly water. Underflow from the thickener 28 passes along pathway 30 to a filter station 31 having wash water 32 applied thereto. Filtrate 33 is returned to leaching station 18, while a cake of $Sn(OH)_4$ and some $Sb_2O_5$ as well as a compound of arsenic is passed along flowpath 34 to a drying or calcining station or dryer 35 heated to a temperature of the order of 500° C. for removing the combined water from tin cake fed thereto for yielding through flowpath 36 calcined tin oxide ($SnO_2$) which is substantially calcium-free but otherwise contaminated with antimony and arsenic.

Dilute effluent 29 from the second thickener station 28 passes along a flowpath 37 back to the primary agitator 18 and comprises in effect a substitute for water indicated at 20. In the pathway 37 is provided valve means 38 by which any amount of desired effluent 29 from the secondary thickener 28 may be bled off to waste through the conduit 39.

Since the principal object of the kiln 12 and the washing and cooling station 16 is to produce a pure $SO_2$ gas, its details will be described later. The $SO_2$ gas is supplied to the leaching stations 18 and 25 and there goes into solution in the water present to form $H_2SO_3$ which is a solvent for calcium of the $CaSnO_3$. The first stage leaching station 18 should have at least about two hours detention, as this aging seems to have a beneficient effect. The solvent $H_2SO_3$ under carefully controlled conditions of pH and dilution will selectively react with the $CaSnO_3$ to produce calcium bisulfite in solution, leaving the $Sn(OH)_4$ insoluble, provided the proper control has been exercised. The $SO_2$ is proportioned to the two agitators as needed to maintain the pH conditions desired by means of valve V in pathway 17.

If no solution is discarded via conduit 39, the pH in the second stage of agitation may be carried lower than in the first stage since any tin which goes into solution is reprecipitated in station 18. Thus in agitator 25, the pH may be allowed to drop to 2.5, or even pH 2.0, without causing any loss of tin.

If the wash water 32 to be used on the filter 31 has appreciable alkalinity it will be found advantageous to lower the pH to 4 or lower by the addition of $SO_2$ before applying to the cake. This will prevent the precipitation of calcium sulfite in the cake.

The pulp or slurry is first dewatered at 22 and the calcium bisulfite solution sent to waste. The tin bearing underflow or pulp 24 is again agitated with $SO_2$ and water in leaching station 25 whence it flows to a second dewatering station 28. The overflow from thickener 28 is returned to agitator 18 while the underflow comprising $Sn(OH)_4$ pulp is filtered at 31 and washed to produce a cake of $Sn(OH)_4$ containing less than 1% Ca on an ignited basis. With extreme care, a calcined product carrying less than 0.3% Ca may be made.

The cake is then dried in drier 35 (Fig. 1) to remove its combined water for yielding $SnO_2$ which is one type of end product of this invention, even though it may contain other contaminants such as arsenic and antimony. Thus main stations of this invention comprise first a station 12 and 16 for producing pure $SO_2$ gas (in pathway 17); a leaching station which preferably is a two-stage as shown at 18 and 25 in the drawing wherein the pH and dilution is controlled followed respectively by their thickeners 22 and 28, and then a station 31 for removing $Sn(OH)_4$ and washing it free of any entrained solution of calcium salt; and a final station for converting the $Sn(OH)_4$ to $SnO_2$. The requirements of each of these stations will now be described:

The $SO_2$ gas producing station is preferably a kiln 12 adapted to burn pyrite 13 because this process is designed for use in a place adjacent a tin ore mine or the tailings pile thereof, and in most such places pyrite is available as a source of $SO_2$. The $SO_2$ must be produced so that when it is dissolved in the water of the leaching station 18, a minimum quantity of $H_2SO_4$ is produced in the solution.

The preferred method of producing the pure $SO_2$ is illustrated herein by washing or cooling or both, of the gas evolved from the kiln, but other methods might be used. For instance, if $SO_3$ were present in the solution, an additional amount of water could be used so that the calcium solubility characteristic of the solution is not decreased. In this instance, the amount of water used must be controlled so as to dissolve the calcium as $CaSO_4$ and this amount will be in excess of that necessary to dissolve the calcium as $Ca(HSO_3)_2$. However, if $CaSO_4$ is not dissolved in the leaching stations, it might be re-dissolved later with water and removed through an extra filtration operation, but all of this is uneconomical and moreover, water is relatively scarce in the localities where this invention is likely to be practiced. Therefore, the fact remains that the best way of practicing this invention is to use a solvent solution in the leaching stations 18 and 25 that comprises $H_2SO_3$ substantially free of $SO_3$ or sulfuric acid and so controlled as to pH and as to dilution of the slurry treated, as to minimize the yielding of any other calcium salt than calcium bisulfite and to minimize the capability of the solution to dissolve tin out of the calcium stannate being treated; for the essential purpose of the leaching stations is to dissolve the calcium selectively away from the stannate while minimizing any dissolution of the tin of the stannate. The capacity of agitator 18 should provide for substantially two hours detention, as such aging gives a lower Sn loss in thickener overflow at 23.

By making use of two-stage leaching such as by agitators 18 and 25 and two-stage thickening such as by thickeners 22 and 28, the plant has great flexibility. Also because the raw water 26, in distinction from dilute thickener overflow 37, added to the secondary agitator 25 gives such direct dilution to the contents of the agitator 25 and the thickener 28 that an unexpected proportion of the calcium seems to be leached out and separated.

With respect to the leaching station 18, it has been stated that the pH should be controlled so that the limits are from 2.5 to 4.0, with the preferred pH being 3.5. The dilution of the slurry of the leaching station 18 should vary with the pH. For instance, at pH 3.5 and 20° C. the dilution should be such that there are about 4.2 grams of CaO per liter, while at pH 2.5 the CaO concentration may be appreciably greater. At the lower pH values, the quantity of tin dissolved is much greater than at the higher values, up to 3 g. p. l. of tin at pH 2.6, while at pH 3.5 less than 0.05 g. p. l. of tin is dissolved under the proper $SO_2$ gassing conditions and time of contact with the solvent solution. Temperature will have an effect on the maximum CaO carrying capacity of the solution but this is not considered to be critical since satisfactory results are obtainable at room temperatures.

With respect to leaching station 25, the CaO concentrations mentioned for station 18 may not be exceeded and should be much lower in order to get the full benefit of the two-step leach. We prefer to add all of the makeup water except that being used on the filter to this station which will give CaO concentrations of the order of ¼ to ½ gm. CaO/liter depending on the amount of Ca dissolved in station 18 and the ratio of liquid to solids in thickener 22 underflow. Filtrate from filter 31 (conduit 33) may also be recycled into agitator 25 instead of having them join 29 and go to 18 directly. Or the first filtrate and the wash filtrate may be separated with the first filtrate preferably going back to 18 and the wash filtrate going to 25.

If this invention is carried out as above described, in the cake going to the dryer there is between 63 and 67 percent Sn. Upon ignition of this residue and the driving off of combined water, it is found that the end product contains from 75 to 78 percent Sn. This compares favorably with the 50 to 52 percent tin on a calcined basis that is in the calcium stannate which forms the starting material.

However, a feature of this invention involves the discovery that direct calcination of the low-calcium $SnO_2$ product at high temperatures, (900–1100° C.), reduces the antimony content from 1% on Sn to 0.2% on Sn. The latter amount, however, is not sufficiently low for producing the best grade of Sn. Further work led to the discovery that ignition of the product at these temperatures under a slightly reducing atmosphere gave almost complete elimination of the antimony (less than 0.01% Sb on Sn remaining). An atmosphere in which the proportion of CO to $CO_2$ is 1 to 10 is satisfactory. There hours ignition at 1000°+ C. gave somewhat better results than three hours at 900° C. The exact temperature and time used will be dictated by local conditions and the purity of product desired. It is presumed that the antimony is originally present in the $SnO_2$ mass in the pentavalent form and that the slightly reducing atmosphere converts this to the trioxide which is sufficiently volatile at the temperatures indicated to be carried off in the gas stream.

If the antimony contaminant is to be removed from the substantially calcium-free filter cake, from flowpath 34, instead of being treated in a dryer 35, to issue therefrom through flowpath 36 as $SnO_2$ with an antimony contaminant, the filter cake from 34 is supplied to a furnace 40 (Fig. 2) through flowpath 34, wherein fuel and air are supplied through conduit 41 in carefully controlled proportions whereby the fuel is incompletely burned and the slightly reducing atmosphere thus established and maintained, and from the furnace issues gas 43 and an end product 44, which comprises $SnO_2$ that is substantially calcium-free and antimony-free. The temperature in the furnace is maintained in a range of from 900° C to 1100° C., so that the antimony contaminant is volatilized. Such a furnace will comprise a heat-treatment zone wherein the filter cake from flowpath 34 is first dried to remove the combined water from the filter cake and thereafter ignited and subjected to a temperature whereat the antimony contaminant volatilizes.

We claim:

1. The process of treating calcium stannate, which comprises bringing together calcium stannate and $H_2SO_3$ for yielding therefrom calcium bisulfite in solution and stannic hydrate as a solid phase reaction product.

2. The process of treating calcium stannate which comprises leaching a slurry of such stannate with solution of sulfur dioxide while controlling the pH of the solution for selectively dissolving out calcium while minimizing dissolution of tin for yielding a solute of $Ca(HSO_3)_2$ and a pulp of $Sn(OH)_2$, then removing and washing solute from the pulp.

3. The process according to claim 2, wherein the range of pH of the solvent solution used is from 2.5 to 4.0.

4. The process according to claim 2, wherein the pH of the solvent solution is substantially 3.5 contributed by an excess of $H_2SO_3$.

5. The process according to claim 2, wherein the pH of the solution is substantially 3.5 and the dilution of the slurry is such that each liter thereof has substantially 2.5 to 4.0 grams of CaO.

6. The process according to claim 2, wherein the sulfur dioxide solution used is washed substantially free of $SO_3$ to minimize the formation of calcium sulfate.

7. The process according to claim 2, wherein the washed pulp is dried at a temperature to drive off combined $H_2O$ for yielding $SnO_2$.

8. The process according to claim 2, wherein the washed pulp is dried and ignited at a temperature above the volatilization point of antimony trioxide, and maintaining during said ignition step a reducing atmosphere such that antimony trioxide is yielded therein from pentavalent antimony.

9. The process of treating calcium stannate which comprises leaching a slurry of such stannate with a solution of sulfur dioxide in a multi-stage leaching operation while controlling in each stage of the leaching the pH of the solution and its dilution for selectively dissolving out calcium while minimizing dissolution of tin for yielding a solute of calcium bisulfite and a pulp of tin hydroxide, removing and washing solute from the pulp, drying and finally heating the pulp at a temperature above the volatilization point of antimony trioxide in a reducing atmosphere of carbon dioxide and a reducing constituent comprising carbon monoxide in an amount equal approximately to 10% of the volume of the carbon dioxide for a time long enough to yield tin oxide substantially free from antimony.

10. The process according to claim 9, wherein the temperature lies in a range from substantially 900° C. to 1100° C.

11. The process according to claim 9, wherein the reducing atmosphere contains CO and $CO_2$ in the approximate proportions of 1 to 10 but less than 1 to 5.

12. The process of treating calcium stannate that is contaminated with pentavalent antimony, which comprises removing calcium by a sulfurous acid leach, dewatering, and thereafter removing antimony by a reducing roast wherein the pentavalent antimony is converted to gaseous antimony trioxide.

ROBERT B. THOMPSON.
ELLIOTT J. ROBERTS.